US010866412B2

(12) United States Patent
Tam et al.

(10) Patent No.: US 10,866,412 B2
(45) Date of Patent: Dec. 15, 2020

(54) COMPACT HEAD-MOUNTED DISPLAY SYSTEM

(71) Applicant: Sharp Kabushiki Kaisha, Osaka (JP)

(72) Inventors: Ka Ho Tam, Oxford (GB); David James Montgomery, Oxford (GB); Scott Wells, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 175 days.

(21) Appl. No.: 16/212,815

(22) Filed: Dec. 7, 2018

(65) Prior Publication Data

US 2020/0183153 A1 Jun. 11, 2020

(51) Int. Cl.
*G02B 27/00* (2006.01)
*G02B 27/01* (2006.01)
*G02B 17/00* (2006.01)

(52) U.S. Cl.
CPC ....... *G02B 27/0081* (2013.01); *G02B 17/002* (2013.01); *G02B 17/008* (2013.01); *G02B 27/0172* (2013.01); *G02B 2027/0123* (2013.01)

(58) Field of Classification Search
CPC ............ G02B 27/0081; G02B 27/0172; G02B 17/008; G02B 2027/0123; G02B 2027/0132; G02B 21/22; G02B 30/00; G02B 30/10; G02B 30/20; G02B 30/22
USPC ................................................ 359/857, 466
See application file for complete search history.

(56) References Cited

U.S. PATENT DOCUMENTS

| | | | | |
|---|---|---|---|---|
| 5,982,343 A | * | 11/1999 | Iba | G02B 27/0172 345/8 |
| 9,019,172 B2 | * | 4/2015 | Tohara | G02B 27/0172 345/7 |
| 2002/0181115 A1 | | 12/2002 | Massof et al. | |
| 2012/0120498 A1 | | 5/2012 | Harrison et al. | |
| 2014/0168783 A1 | | 6/2014 | Luebke et al. | |
| 2017/0371162 A1 | | 12/2017 | Makino | |
| 2020/0049964 A1 | * | 2/2020 | Zeng | G02B 1/11 |

FOREIGN PATENT DOCUMENTS

| | | |
|---|---|---|
| EP | 2030186 | 3/2009 |
| WO | WO 2015077718 | 6/2016 |
| WO | WO 2016118643 | 7/2016 |

* cited by examiner

*Primary Examiner* — Kristina M Deherrera
(74) *Attorney, Agent, or Firm* — Renner, Otto, Boisselle & Sklar, LLP

(57) ABSTRACT

A head-mounted display (HMD) system includes an optical arrangement; a first image panel, wherein the optical arrangement directs image light from the first image panel along a first optical pathway; a second image panel, wherein the optical arrangement directs image light from the second image panel along a second optical pathway different from the first optical pathway; and a third image panel and a fourth image panel, wherein the third and fourth image panels are spaced apart from each other and the optical arrangement directs light from the third image panel and the fourth image panel along different optical pathways. The optical arrangement is configured such that light from the first image panel and the third image panel are emitted from the HMD system in a combined fashion in a first eye direction, and light from the second image panel and the fourth image panel are emitted from the HMD system in a combined fashion in a second eye direction different from the first eye direction.

20 Claims, 9 Drawing Sheets

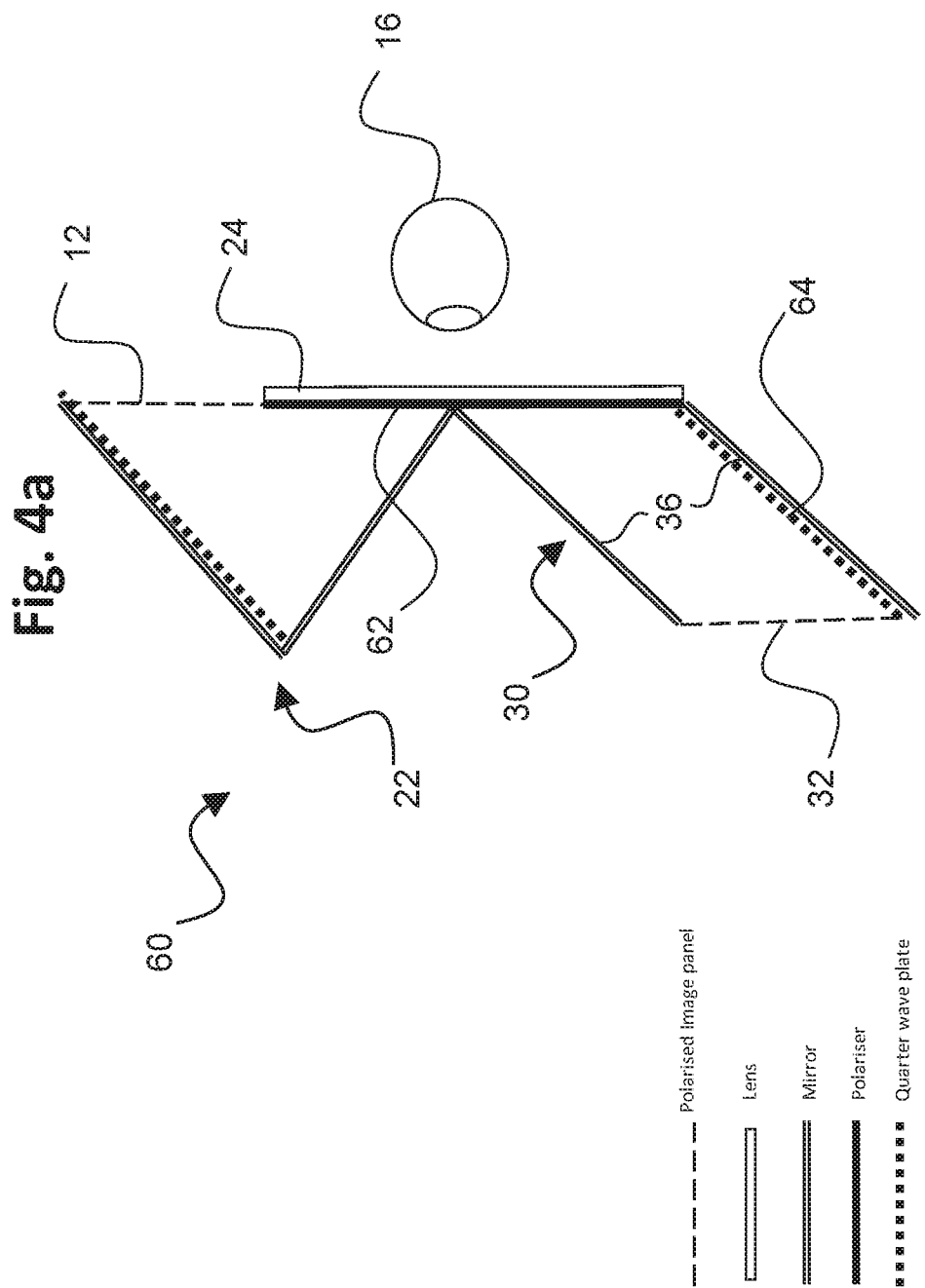

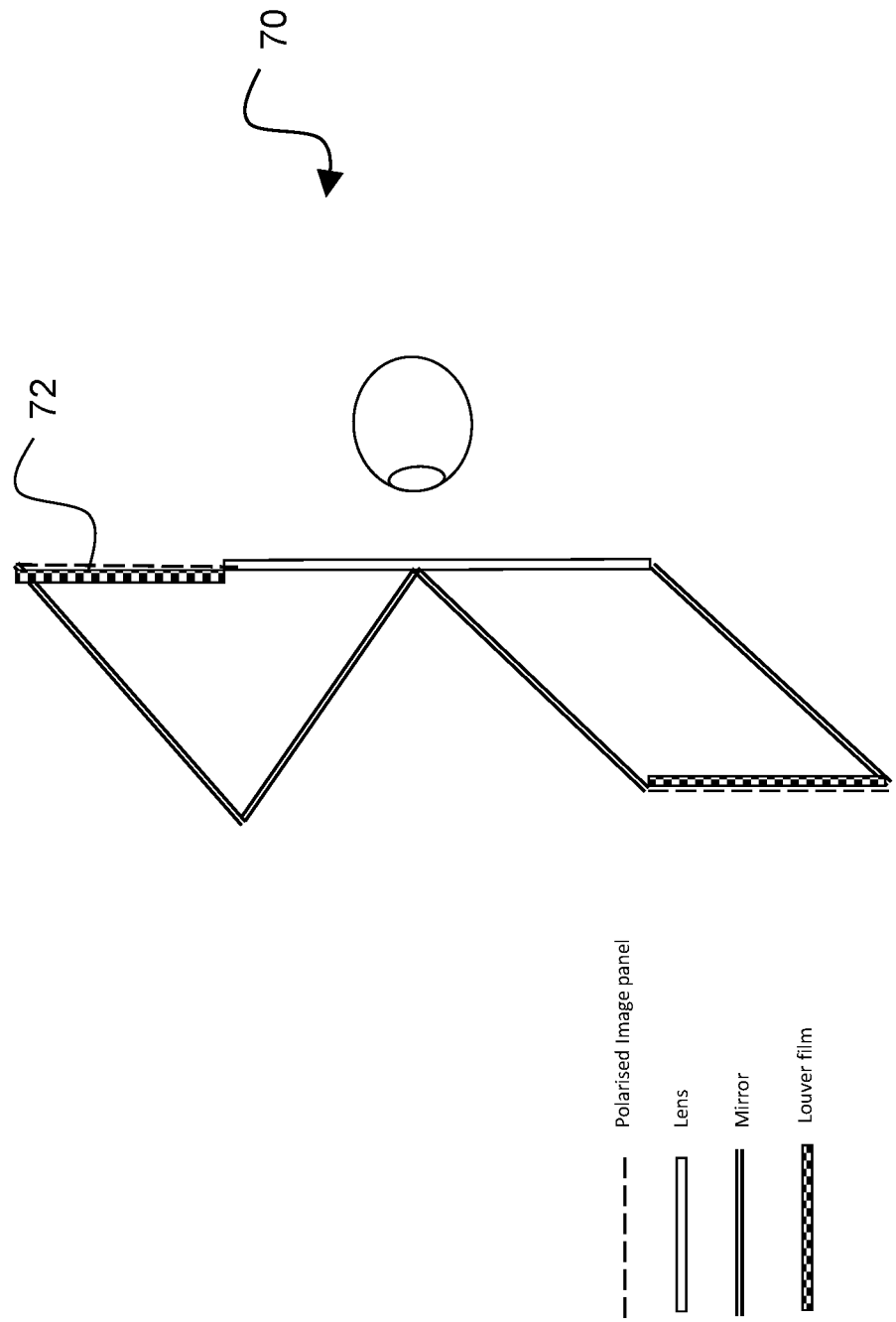

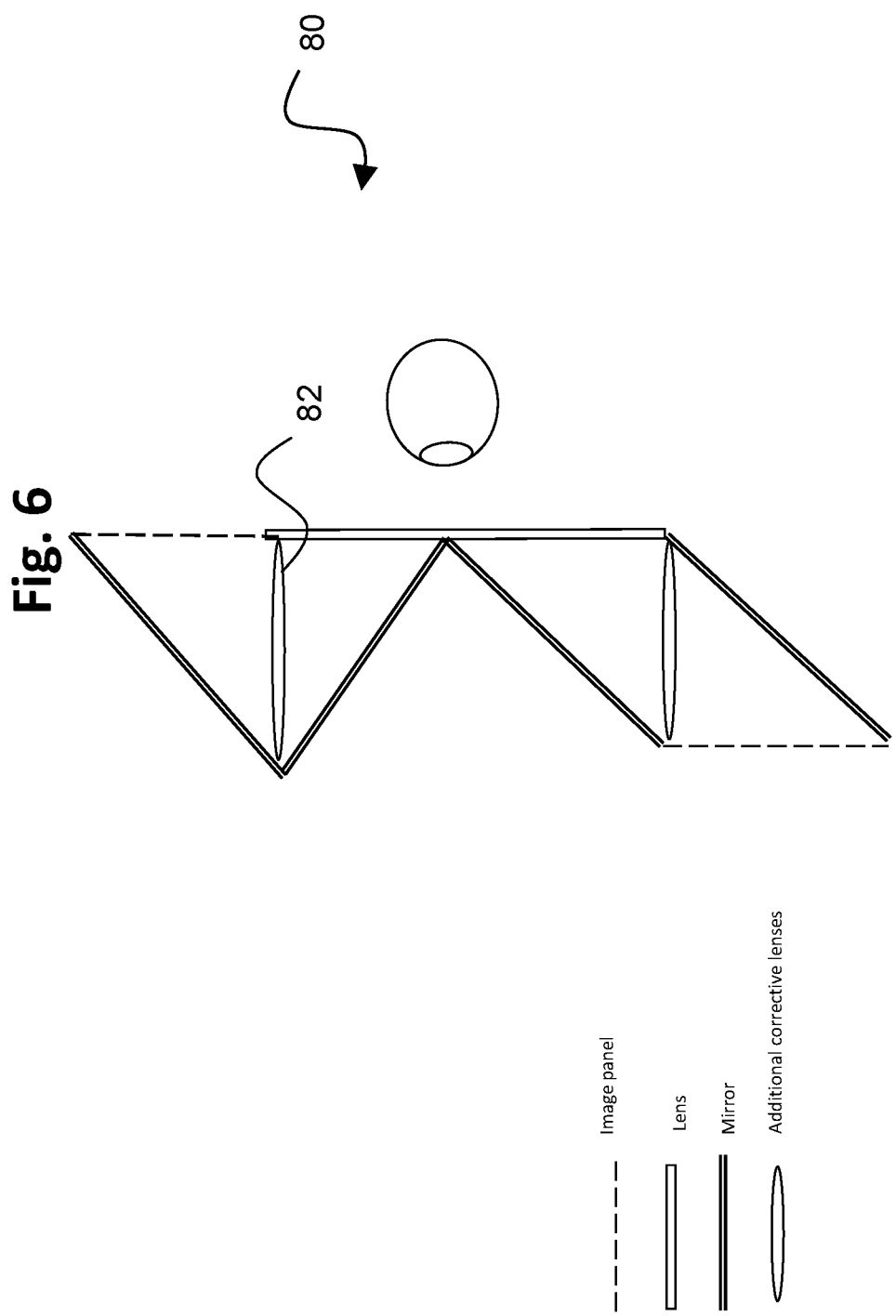

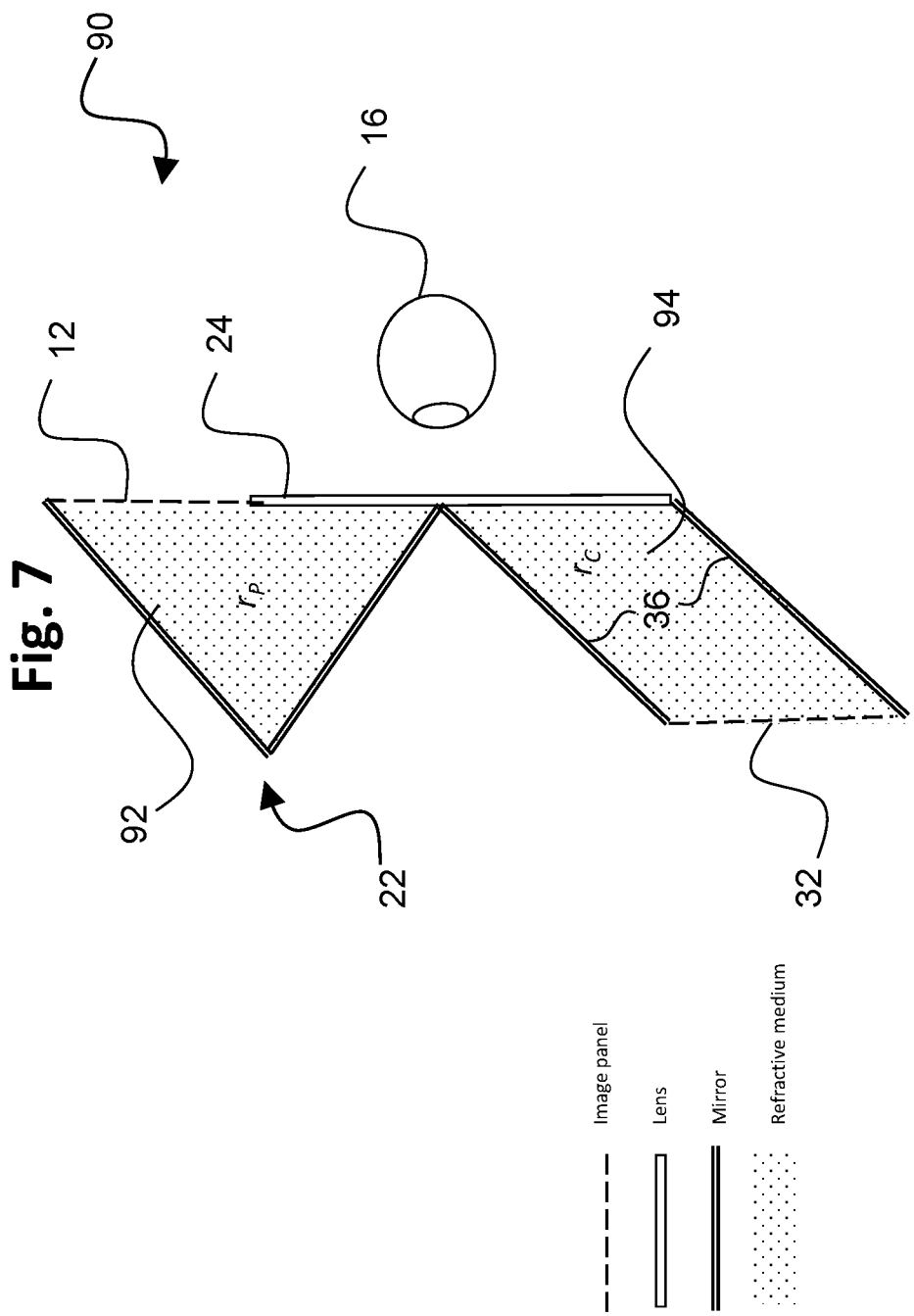

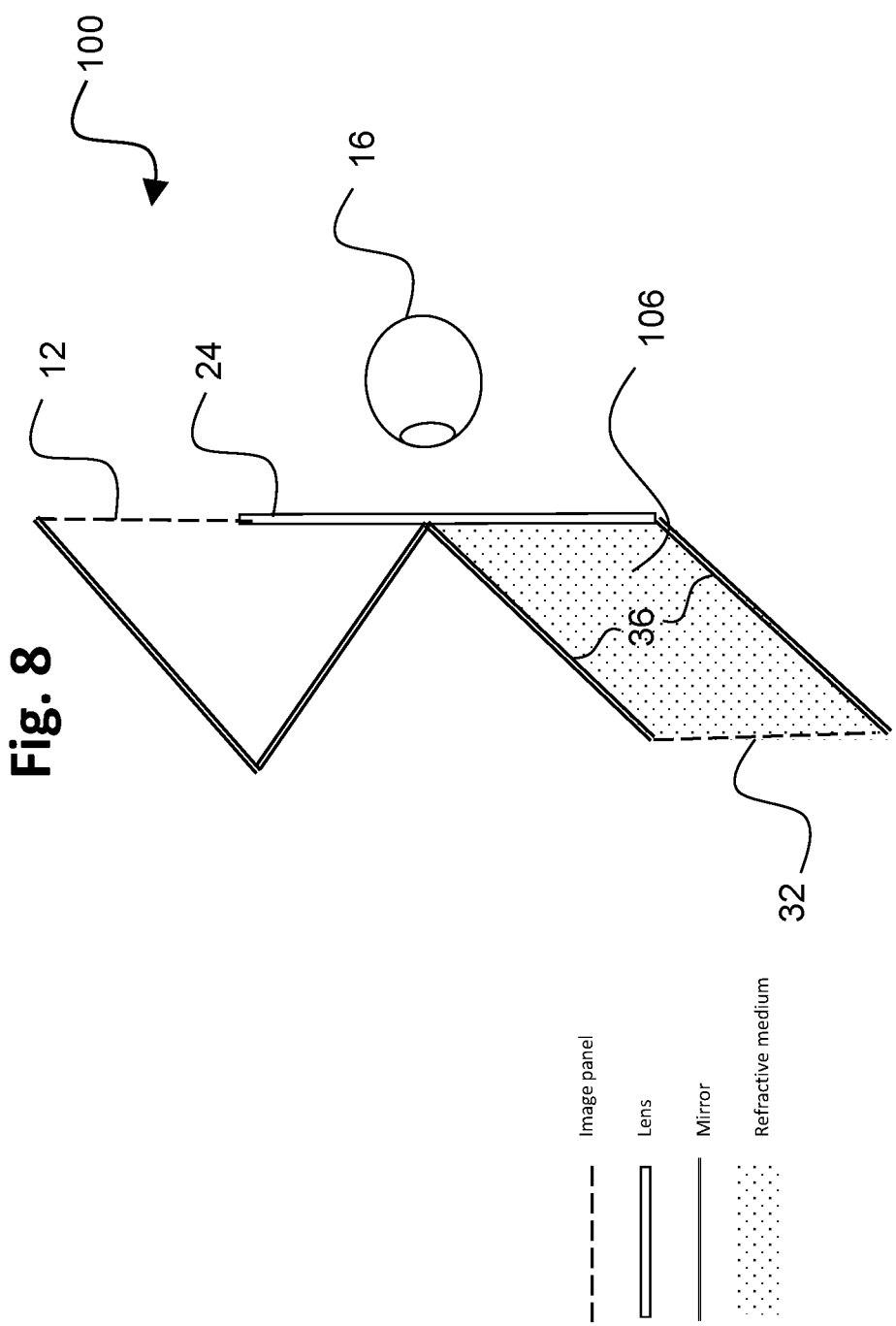

COMPACT HEAD-MOUNTED DISPLAY SYSTEM

TECHNICAL FIELD

The present invention has application within the field of compact wearable displays, and in particular, head-mounted display (HMD) systems used for applications such as virtual reality and augmented reality.

BACKGROUND ART

A head-mounted display (HMD) system is a type of wearable device with increasing popularity within the consumer electronics industry. HMDs, along with similar devices such as helmet-mounted displays, smart glasses, and virtual reality headsets, allow users to wear a display device such that the hardware remains fixed to their heads regardless of the user's movement.

When combined with environmental sensors such as cameras, accelerometers, gyroscopes, compasses, and light meters, HMDs can provide users with experiences in virtual reality and augmented reality. Virtual reality (VR) allows a user to be completely submerged into a virtual world where everything the user sees comes from the display device. Devices that provide augmented reality (AR) allow users to optically see the environment, and images generated by the display device are added to the scene and may blend in with the environment. Accordingly, traditional VR and AR technology involves a display that is mounted in front of the user's head with a lens configuration that determines the virtual image position and field.

A basic layout of typical commercial VR or AR systems (both involving and not involving use of a smartphone for a display) includes a display device and a lens structure that images the display light into the far field to enable comfortable viewing. To ensure sufficient magnification, with wide field of view and to have a virtual image at a far enough distance from the eye, the size of this arrangement is restricted. In addition, the display is a relatively far distance from the eyes, meaning that the device must be strapped to the head to not fall off. Furthermore, the weight of the device is far forward when worn, meaning that long term viewing could become tiresome on the face and neck due to the torque generated about the head by the weight of the device. Lens elements used in such systems may be configured as a normal curved surface lens of known type, or a structured Fresnel lens with angled features of known type, or other known lens arrangements involving one or more lenses.

One of the primary elements of HMDs is the display module mounted onto the head. However, since the unaided human eye cannot accommodate (that is, change optical power to provide a focused image) for images closer than a certain distance from the eye, eyepiece lenses are required to re-image the display module such that the display image appears to be at a comfortable viewing distance from the user. Such optical configuration requires substantial space between the eyepiece and the display module. Furthermore, complex lenses are needed if the HMD needs to display images with high quality and a wide field of view (FOV). The result of these requirements in conventional systems is a heavy and bulky headset that is uncomfortable to wear for any length of time, and the size is limited by basic optics to achieve the correct magnification and the virtual image distance.

A number of known methods have been used to attempt to achieve image panel-based, light-weight HMDs without the need for bulky eyepiece lenses. "Light-field displays" (also known as integral imaging) provides for one of the thinnest types of HMD systems, but along with other magnifier-based HMDs, light-field displays suffer from a fundamental limit whereby the display's resolution is heavily traded off for a smaller hardware form factor.

One known method for reducing the size and weight of an HMD system includes the use of a polarization reflection approach to reduce size. Such configurations, however, suffer from ghost image formation. Another method uses multiple small lenses with overlapping images that modify the magnification required. However, such an arrangement has a lower apparent resolution and can suffer from visibility of the image overlap. Applicant's commonly owned Application GB 1621621.0, filed Dec. 19, 2016, describes an alternative overlap method with two displays and a folded W-shaped mirror arrangement. The field of view in this case is defined by the maximum aperture and path length.

SUMMARY OF INVENTION

There is a need in the art, therefore, for an enhanced HMD system that is compact and comfortable to wear, without sacrificing image quality as needed for optimal VR and AR applications. The present invention provides for HMD configurations that are light weight and comfortable for viewing, with high image quality and a wide field of view (FOV). Configurations of an HMD system described in this disclosure solve problems of existing HMD systems by folding up the optical path of the HMDs using segmented images from multiple image panels, such that the optical distance from the image panels to eye can be increased without compromising on the HMD system's thickness.

The HMD system of the present disclosure improves the compactness of the system while using a folded optical arrangement. Configurations of the HMD system employ a combination of image panels that are on the eye or viewing side of the eyepiece lenses, close to the head, and also image panels that are on the image or non-viewing side of the eyepiece lenses. An advantage of such arrangement is that the HMD system protrudes from the face for a distance less than previous designs, and therefore can have a significant reduced weight, is much closer to the face, and hence would produce less fatigue while wearing. The design also means near-eye optics can be used to give a large FOV, but also allows space for the user's nose to provide a more comfortable configuration to wear.

In exemplary embodiments, an HMD system includes four image panels, including first and second image panels of equal dimensions, and third and fourth image panels that may be combined of equal dimensions to one of the first/second image panels. The first image panel and the second image panel are respectively used to present an image in an unshared fashion respectively to each of the left eye and the right eye. The HMD system further includes the third image panel that presents an image to the right eye, and the fourth image panel that presents an image to the left eye. With such configuration, each of the left and right eye can see two image panels, including one large image panel of either the first or second image panel, and one smaller image panel of either the third or fourth image panel. Further with such configuration, images from the various image panels are combined such that the images optimally fill the typical human visual field.

The described configuration has an advantage in that there is as little unseen area on the image panels as practicable, which minimizes the form factor of the HMD system. In addition, with such configuration the optical arrangement allows plenty of room for the user's nose. Furthermore, the weight is concentrated closer to the user's head, so the torque on the head and neck is reduced, and the conventional requirement for a strap to wear the system becomes less necessary. The result is an enhanced HMD system that is compact and comfortable to wear, without sacrificing image quality as needed for optimal VR and AR applications.

An aspect of the invention, therefore, is a head-mounted display (HMD) system including two main image panels and two additional image panels, wherein the image panels are positioned to emit image light that optimally fills a typical visual field. In exemplary embodiments, a head-mounted display (HMD) system includes an optical arrangement; a first image panel, wherein the optical arrangement directs image light from the first image panel along a first optical pathway; a second image panel, wherein the optical arrangement directs image light from the second image panel along a second optical pathway different from the first optical pathway; and a third image panel and a fourth image panel, wherein the third and fourth image panels are spaced apart from each other and the optical arrangement directs light from the third image panel and the fourth image panel along different optical pathways. The optical arrangement is configured such that light from the first image panel and the third image panel are emitted from the HMD system in a combined fashion in a first eye direction, and light from the second image panel and the fourth image panel are emitted from the HMD system in a combined fashion in a second eye direction different from the first eye direction.

In exemplary embodiments, the first image panel and the third image panel are positioned on opposite sides of an ocular axis, and the second image panel and the fourth image panel are positioned on opposite sides of the ocular axis. The optical arrangement may include first and second lens components that may extend perpendicularly or at an acute angle off of perpendicular relative to the ocular axis respectively between the first and third image panels, and the second and fourth image panels. In an orientation of use, the first and second image panels may be arranged with the long sides horizontal or at an acute angle relative to horizontal and short sides vertical or at an acute angle relative to vertical, and the third and fourth image panels are also arranged with the long sides horizontal or an acute angle relative to horizontal and short sides vertical or at an acute angle relative to vertical.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 4a and FIG. 4b are drawings depicting a top view of another exemplary HMD system in accordance with embodiments of the present invention, including additional polarizers and quarter wave plates.

FIG. 5 is a drawing depicting a top view of another exemplary HMD system in accordance with embodiments of the present invention, including additional louver films applied to the image panels.

FIG. 6 is a drawing depicting a top view of another exemplary HMD system in accordance with embodiments of the present invention, including additional corrective lens elements.

FIG. 7 is a drawing depicting a top view of another exemplary HMD system in accordance with embodiments of the present invention, in which a volume between an image panel and a lens component is filled with a refractive material.

FIG. 8 is a drawing depicting a top view of another exemplary HMD system in accordance with embodiments of the present invention, including a central refractive material and a singular lens component for the eyepiece.

DESCRIPTION OF EMBODIMENTS

Figure 1:
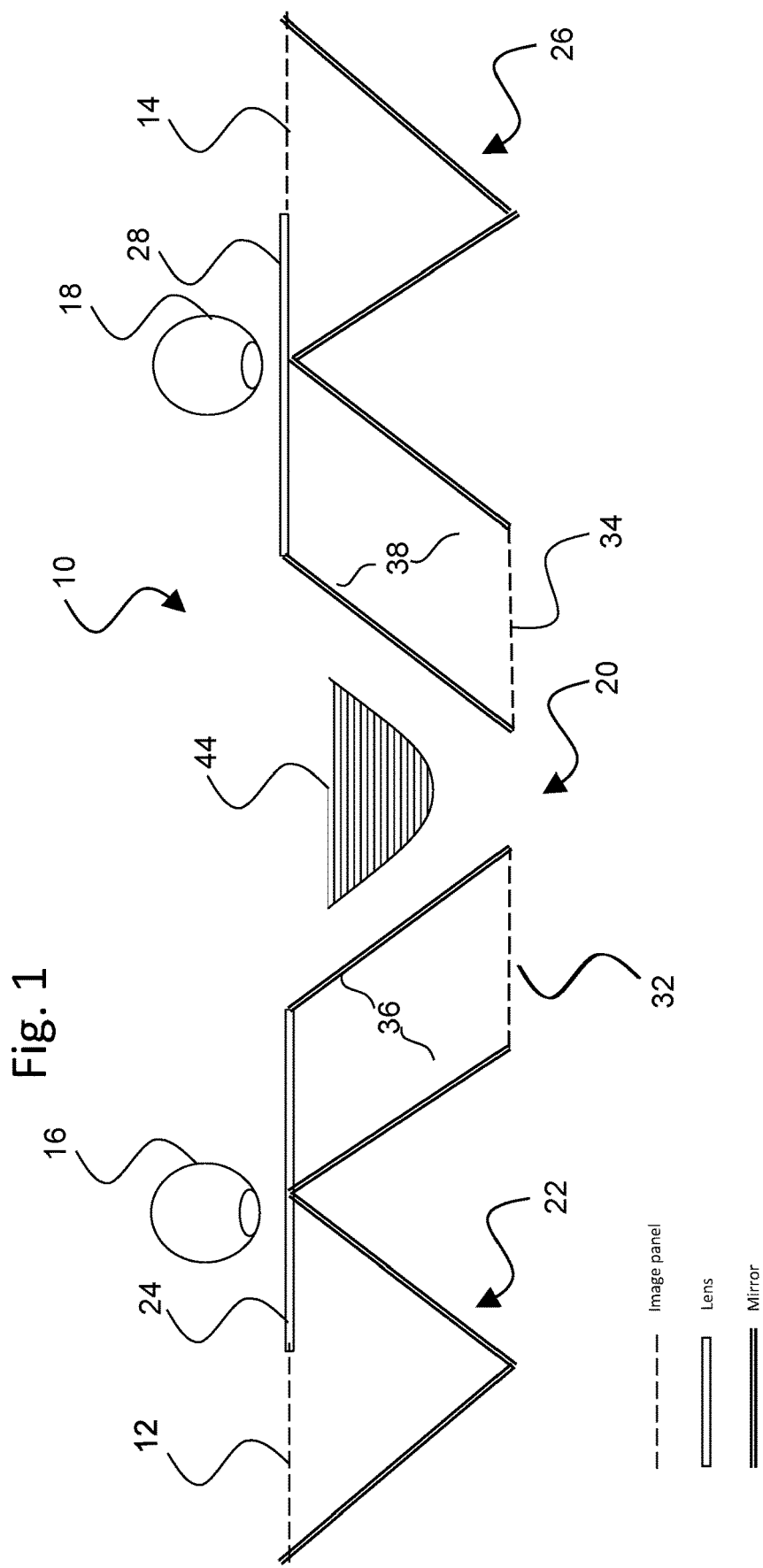
FIG. 1 is a drawing depicting a top view of an exemplary head-mounted display (HMD) system in accordance with embodiments of the present invention.

Embodiments of the present invention will now be described with reference to the drawings, wherein like reference numerals are used to refer to like elements throughout. It will be understood that the figures are not necessarily to scale.

FIG. 1 is a drawing depicting a top view of an exemplary head-mounted display (HMD) system 10 in accordance with embodiments of the present invention. In exemplary embodiments, the HMD system includes four image panels, including first and second image panels of equal dimensions, and third and fourth image panels that may be combined of equal dimensions to one of the first/second image panels. Referring to the figure, a first image panel 12 and a second image panel 14 are respectively used to present an image in an unshared fashion to each of the right eye 16 and the left eye 18 of a user. The HMD system 10 further includes an offset portion 20 that is located offset relative to the first and second image panels. The offset portion includes a third image panel 32 that presents an image to the right eye, and a fourth image panel 34 that presents an image left eye. Accordingly, the third and fourth image panels are spaced apart from each other and spaced apart relative to the first and second image panels, and the optical arrangement directs light from the third image panel and the fourth image panel along different optical pathways With such configuration, each of the left and right eye can see two image panels, including one large image panel of either the first or second image panel, and one smaller image panel of either the third or fourth image panel. Further with such configuration, images from the various image panels are combined such that the images optimally fill the typical human visual field. The image display panels may be electronically controlled with suitable electronics incorporated into the HMD system in any suitable manner as is known in the art, so as to emit image light corresponding to the desired images from each image panel. Accordingly, for simplicity of illustration the control electronics is omitted from the figures.

In configurations of the HMD system 10, the first and second image panels 12 and 14 are located on a viewing or eye side of the HMD system, close to the head. The third and fourth image panels 32 and 34 are located on a non-viewing or imaging side of the HMD system. An advantage of such arrangement is that the HMD system protrudes from the face for a distance less than previous designs, and therefore can have a significant reduced weight. The system overall is positioned much closer to the face as compared to conventional configurations, and hence produces less torque relative to the head thereby reducing fatigue while wearing. The design also means near-eye optics can be used to give a large FOV, but also allows space for the user's nose to provide a more comfortable configuration to wear.

An aspect of the invention, therefore, is a head-mounted display (HMD) system including two main image panels and two additional image panels, wherein the image panels are positioned to emit image light that optimally fills a typical visual field. In exemplary embodiments, a head-mounted display (HMD) system includes an optical arrangement; a first image panel, wherein the optical arrangement directs image light from the first image panel along a first optical pathway; a second image panel, wherein the optical arrangement directs image light from the second image panel along a second optical pathway different from the first optical pathway; and a third image panel and a fourth image panel, wherein the third and fourth image panels are spaced apart from each other and the optical arrangement directs light from the third image panel and the fourth image panel along different optical pathways. The optical arrangement is configured such that light from the first image panel and the third image panel are emitted from the HMD system in a combined fashion in a first eye direction, and light from the second image panel and the fourth image panel are emitted from the HMD system in a combined fashion in a second eye direction different from the first eye direction.

In exemplary embodiments the optical arrangement includes a plurality of mirror components and a plurality of lens components, wherein the plurality of mirror components are configured to direct image light from the first, second, third, and fourth image panels along respective optical pathways to the plurality of lens components. Referring to FIG. 1, the optical arrangement may be configured as follows. As associated with the first image panel 12, a first mirror assembly 22 directs image light from the first image panel 12 along a first optical pathway to a first lens component 24, and ultimately to the right eye 16. To minimize the size or footprint of the HMD system, the first mirror assembly 22 may be configured with a plurality of mirror segments in a "folded" or wedge-shaped arrangement, whereby the optical path of light is increased while maintaining a minimal size. With such configuration, light emitted from the first image panel 12 is directed by the mirror segments of the first mirror assembly 22 only through the first lens component 24, and thus only to one (the right) eye.

Similarly, as associated with the second image panel 14, the HMD system 10 further includes a second mirror assembly 26 that directs image light from the second image panel 14 along a second optical pathway different from the first optical pathway, to a second lens component 28 and ultimately to the left eye 18. Similarly to minimize the size or footprint of the HMD system, the second mirror assembly also may be configured with a plurality of mirror segments in a "folded" or wedge-shaped arrangement, whereby the optical path of light is increased while maintaining a minimal size. With such configuration, light emitted from the second image panel 14 is directed by the mirror segments of the second mirror assembly 26 only through the second lens component 28, and thus only to one (the left) eye.

As associated with the third image panel 32 and the fourth image panel 34, the HMD system 10 further includes respectively a third mirror assembly 36 and fourth mirror assembly 38 that direct image light from such image panels as follows. Light emitted from the third mage panel portion 32 is directed by the third mirror assembly 36 to one (e.g., the right) eye 16, and image light emitted from the fourth image portion 34 is directed by the fourth mirror assembly 38 to the other (e.g., the left) eye 18 along different optical pathways.

The third and fourth mirror assemblies 36 and 38 also are configured as a plurality of mirror segments that are arranged to provide a compact and easily worn configuration. For particular mirror segments, the third mirror assembly 36 includes a first nose segment adjacent to the user's nose 44 when worn, and a first external segment opposite from the first nose segment. Similarly, the fourth mirror assembly 38 includes a second nose segment adjacent to the user's nose 44 when worn, and a second external segment opposite from the second nose segment. The nose segments are arranged to accommodate the user's nose 44 when the HMD system is worn, with the external segments permitting a controlled directing of the image light in a compact arrangement. To accommodate the different image panels 32 and 34, the first and second nose segments are spaced apart from each other, and the first and second external segments are parallel to respective nose segments.

Figure 2:
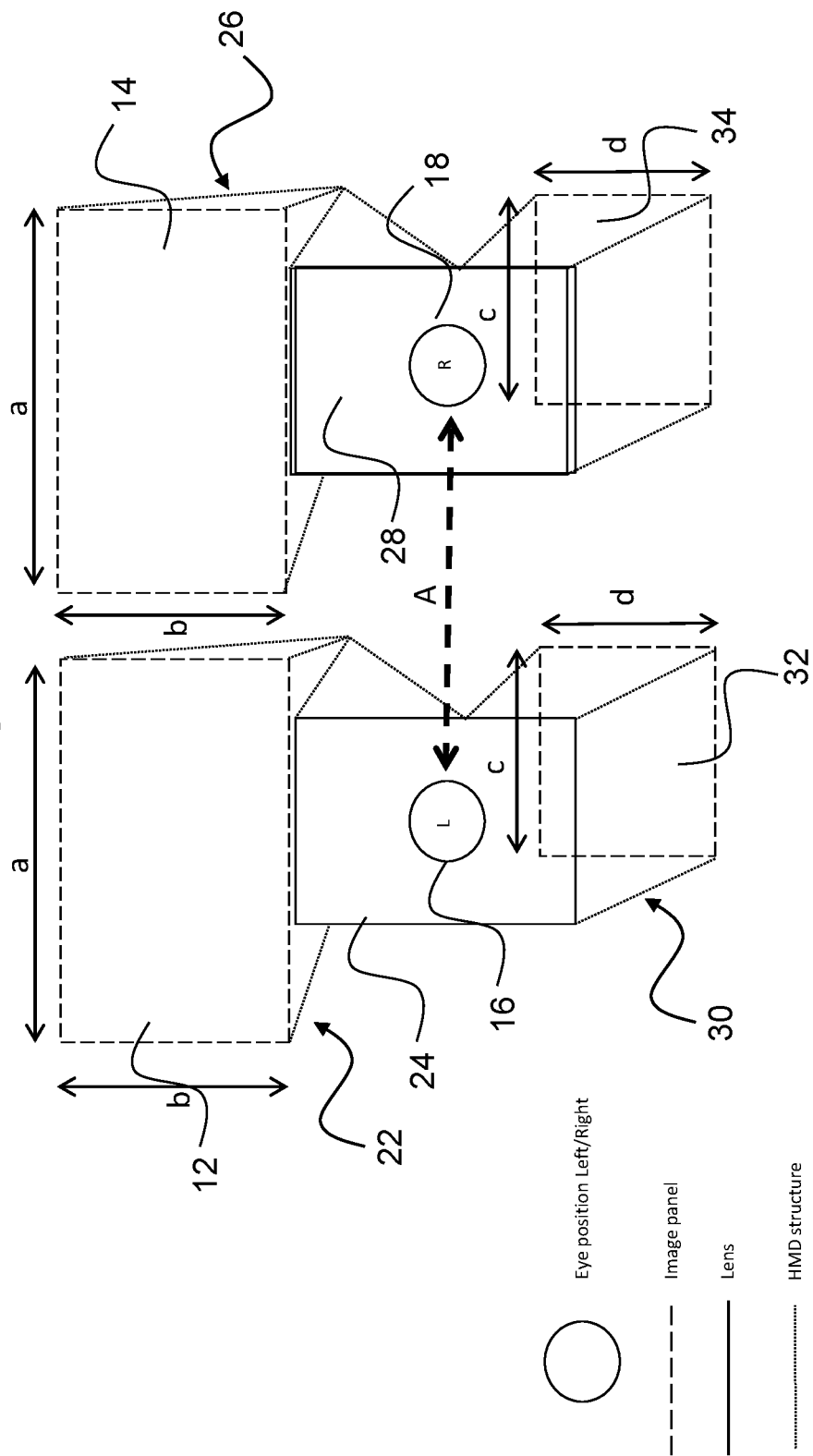
FIG. 2 is a drawing depicting an isometric view of the exemplary HMD system of FIG. 1.

FIG. 2 is a drawing depicting an isometric view of the exemplary head-mounted display (HMD) system 10 of FIG. 1. The viewpoint of FIG. 2 is in a direction looking at the eyepieces, i.e., as from the direction of the user when the HMD system 10 is being worn. FIG. 2 defines an ocular axis "A" that corresponds to a typical eye alignment of the left and right eyes, which also may correspond to a line that bisects the first and second lens elements 24 and 28. In exemplary embodiments, the first image panel 12 and the third image panel 32 are positioned on opposite sides of the ocular axis A, and similarly the second image panel 14 and the fourth image panel 34 also are positioned on opposite sides of the ocular axis A. In one exemplary embodiment, the first and second lens components 24 and 28 extend perpendicularly to the ocular axis A. In another exemplary embodiment, the first and second lens components 24 and 28 extend at an acute angle off of perpendicular relative to the ocular axis A. In this manner, the image panels that are not co-planar with the eyepiece are positioned downwards relative to the ocular axis, which permits space for the nose and cheekbones to be located comfortably. Appropriate image processing is then performed so that the images are seen properly aligned in both eyes.

As referenced above, in the example of FIG. 2 the first and second lens components 24 and 28 extend perpendicularly relative to the ocular axis A, although the first and second lens components 24 and 28 may extend substantially perpendicularly being at any acute angle off of perpendicular relative to the ocular axis A so as to optimally allow and configure such additional space for the nose. In this regard, FIG. 3 is a drawing depicting an isometric view of the exemplary HMD system of FIG. 2 with an alternative orientation of the system in which the first and second lens components 24 and 28 extend substantially perpendicularly at an acute angle off of perpendicular relative to the ocular axis A.

Figure 3:
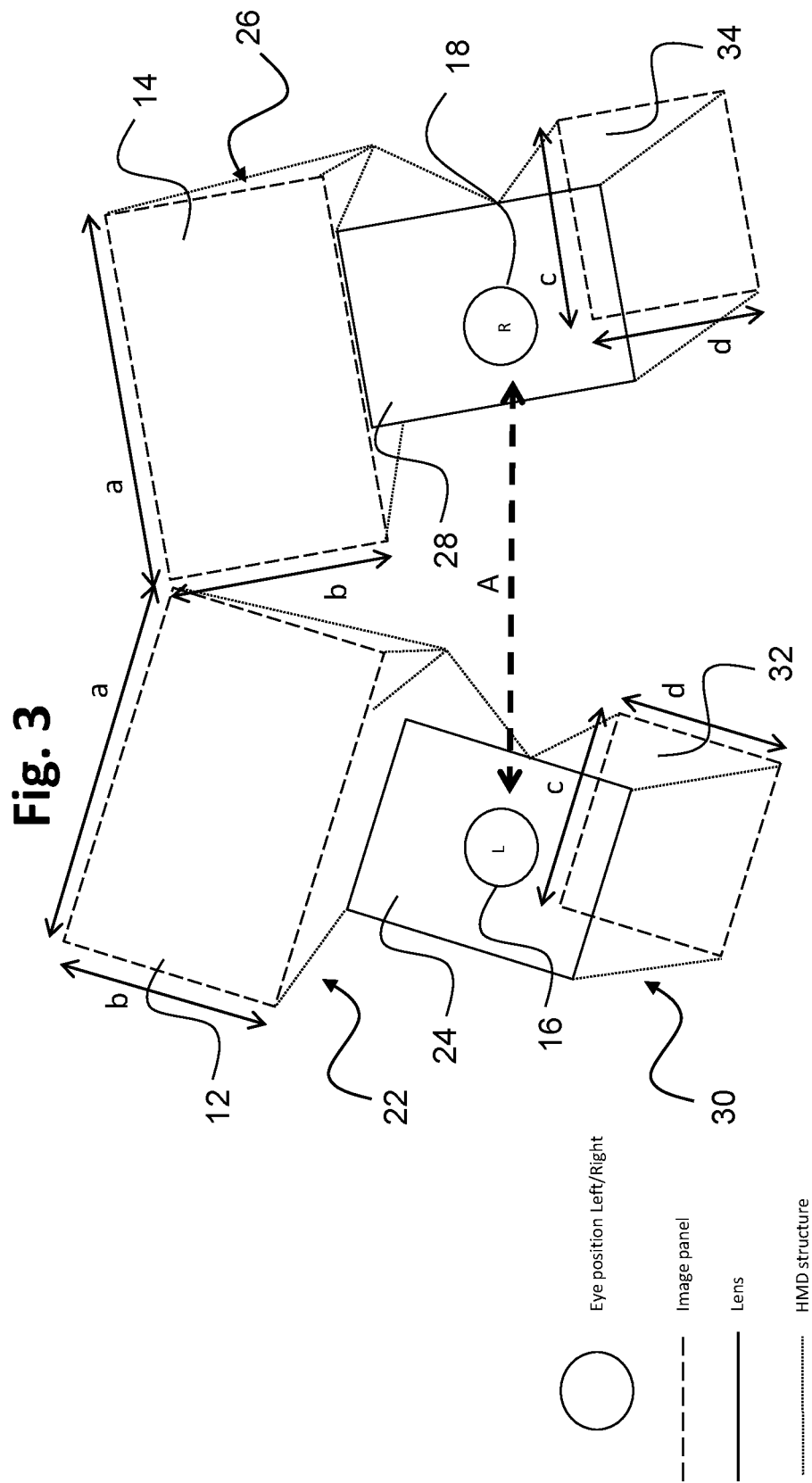
FIG. 3 is a drawing depicting an isometric view of the exemplary HMD system of FIG. 2 with alternative orientation of the system.

In the particular examples of FIGS. 2 and 3, the first image panel 12 and the second image panel 14 are rectangular image panels of generally equal dimensions, and in particular have an equal area of the light emitting surfaces.

Accordingly, each of said image panels has a long side "a" and a short side "b". In an orientation of use, the first and second image panels 12 and 14 are arranged with the long sides "a" horizontal (FIG. 2) or at an acute angle relative to horizontal (FIG. 3), and the short sides "b" vertical (FIG. 2) or at an acute angle relative vertical (FIG. 3). Similarly, the third and fourth image panels 32 and 34 are also arranged with the long sides "c" horizontal (FIG. 2) or at an acute angle relative horizontal (FIG. 3), and the short sides "d" vertical (FIG. 2) or at an acute angle relative to vertical (FIG. 3). In an exemplary embodiment, a combined area of the third and fourth image panels is equal to the area of one of the first or second image panels, and/or the areas of the third and fourth image panels are equal to each other. In addition, as referenced above the third image panel 32 and fourth image panel 34 are spaced apart from each other for comfortable accommodation of the user's nose.

Using four image panels configured as described provides an efficient and cost-effective way of imaging onto the human field of view. Light emitted from the third image panel 32 is combined with light emitted from first image panel 12; and light emitted from the fourth image panel 34 is combined with light emitted from second image panel 14. The disclosed configuration of an HMD system has advantages over conventional configurations. The use of a four-image-panel configuration, in which image light emitted from pairs of image panels is combined for each eye, has an advantage in that there is as little unseen area on the image panels as is practicable, which minimizes the form factor of the HMD system. In addition, with such configuration the optical arrangement allows plenty of room for the user's nose to provide a more comfortable fit for wearing the HMD system. Furthermore, the weight of the HMD system is concentrated closer to the user's head as compared to conventional configurations, so the torque on the head and neck is reduced, and the conventional requirement for a strap to wear the system becomes less necessary. The result is an enhanced HMD system that is compact and comfortable to wear, without sacrificing image quality as needed for optimal VR and AR applications.

FIG. 4*a* is a drawing depicting a top view of another exemplary head-mounted display (HMD) system 60 in accordance with embodiments of the present invention, including additional polarizers and quarter wave plates (QWP). The image panels, mirror components, and lens components are configured comparably as in the embodiment of FIG. 1. Accordingly, reference numerals for such like components are omitted from FIG. 4*a* (and likewise are omitted from subsequent figures) so as to more clearly identify the additional features of the various embodiments. In addition, FIG. 4*a* (and subsequent figures) illustrates pertinent HMD components in connection with only one of the eyes, and it will be appreciated that comparable components depicted in these figures may be provided with respect to the other eye. Generally in the configuration of FIG. 4*a*, polarizers and QWPs may be added to the HMD system 60 to minimize ghost imaging, thereby improving overall image quality.

The example configuration of FIG. 4*a* has particular applicability to HMD systems that employ image panels that typically emit natively polarized light, such as for example liquid crystal display (LCD) devices. LCDs typically emit light that is natively polarized. In addition, ghost images may be generated if both reflected light and non-reflected light reaches the lens components from the image panels. Accordingly, the various image panels may be image panel types that emit natively polarized light, and polarizers and QWPs are added to ensure that light emitted only along certain optical pathways can be transmitted through the lenses to the user.

In exemplary embodiments, therefore, the optical arrangement further comprises a polarizer located on each of the lens components, and a quarter wave plate located respectively on a mirror component associated with each of the image panels. Referring to the example of FIG. 4*a*, the optical arrangement includes a polarizer 62 that blocks light from passing through the lenses that are of the native polarization of the image display panels. In this manner, for example, light cannot pass directly from the image panel 32 through the lens component 24. The HMD system 60 further includes a plurality of quarter wave plates (QWPs) 64. The QWPs 64 operate to alter the polarization of light from the native polarization of the LCDs to a polarization that can pass through the polarizer 62. In this manner, light only passes through the lens component along common optical pathways, whereby light may pass through for which polarization is altered by the QWPs, and then directed to the lens component by reflection off of the mirror components. By limiting the passage of light through the lens along only certain optical pathways, ghost images are avoided. This arrangement minimizes ghost images with the polarizer 62 located either behind (as shown in FIG. 4*a*) or in front of the lens component relative to the eyes when the HMD system is worn.

Figure 4B:
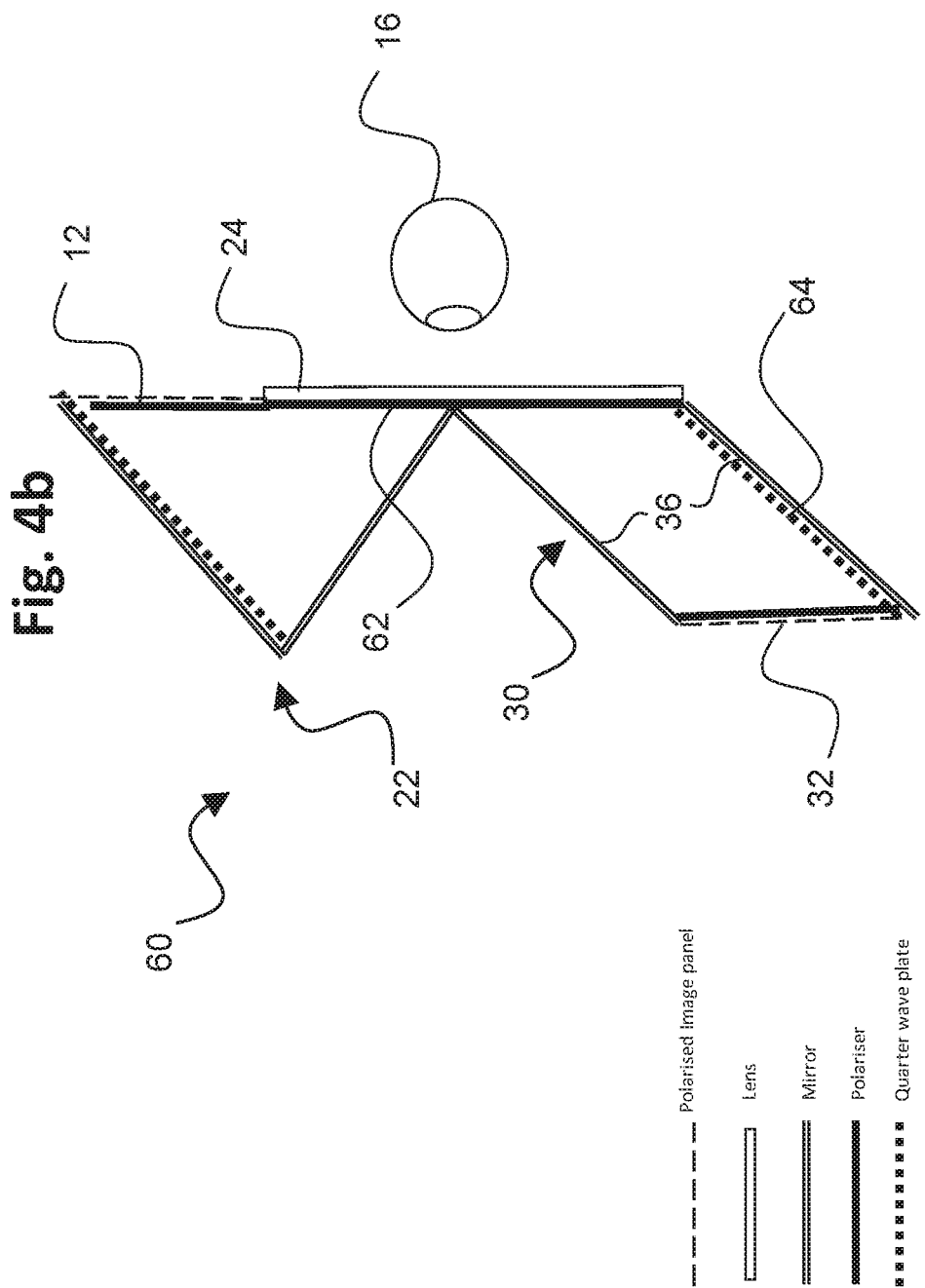

As referenced above, the example configuration of FIG. 4*a* has particular applicability to HMD systems that employ image panels that typically emit native polarized light. In exemplar embodiments, the first, second, third, and fourth image panels emit natively non-polarized light. For image panels that natively emit non-polarized light (e.g. organic light-emitting diode displays or OLED displays), additional polarizers can be located in front of the image panels on the non-viewing side to achieve a comparable effect. In this manner, non-polarized light emitted from OLED image panels is immediately polarized comparably as if the light had been emitted from the image panels with a native polarization. FIG. 4*b* depicts such an embodiment in which an additional polarizer element is provided on each of the image display panels. The QWP can alternatively be placed on the opposing mirrors 22 and 36 as well.

Alternative configurations may be employed to minimize the generation of ghost images. For example, the optical arrangement may include a plurality of light-directing components that are configured to ensure that only light emitted along certain desired optical pathways can pass through the lens components. For example, FIG. 5 is a drawing depicting a top view of another exemplary head-mounted display (HMD) system 70 in accordance with embodiments of the present invention, including additional louver films 72 applied to each of the first, second, third, and fourth mage panels to act as light-directing components. The louver films 72 operate to direct the image light towards respective and correct mirror components, and away from the lens components, such that only light along the desired optical pathways is emitted through the lens components. The configuration using the louver films 72 has an advantage of not requiring the light from the image panels to be polarized. A comparable directional effect to direct the light along desired optical pathways also can be achieved by using a directional backlight instead of a louver film.

As another example of using a light-directing component, FIG. 6 is a drawing depicting a top view of another exemplary head-mounted display (HMD) system 80 in accordance with embodiments of the present invention, including additional corrective lens elements 82 that are incorporated into the HMD system to act as light-directing components. The corrective lens elements 82 operate as a secondary lens for each optical path as shown in the figure. This configuration minimizes geometric distortion and otherwise operates to reduce image aberrations such as chromatic aberration. The corrective lens elements 82 each can be a curved lens, a free form lens structure, or a Fresnel lens structure.

FIG. 7 is a drawing depicting a top view of another exemplary head-mounted display (HMD) system 90 in accordance with embodiments of the present invention, in which in the optical arrangement, a volume between an image panel and a lens component is filled with a transparent refractive material. The presence of the refractive material operates to improve the field of view. In exemplary embodiments, the transparent refractive material may be air, or may be a transparent plastic material such as Poly(methyl methacrylate) (PMMA), or similar type of acrylic or comparable transparent plastic material, as further detailed below. The refractive material can be shaped to fit the area between the image panels and the lens components, and can be attached to or not attached to the image panels themselves. In addition, the refractive materials may be utilized in combination with components of the embodiments of FIGS. 4a and 4b, including the additional polarizers and QWPs. The polarizers and the QWPs may be bonded to the refractive material, thereby reducing ghost images as described above. Anti-reflection coatings on the polished surfaces of the refractive material, i.e., where the light passes through, also will contribute to reducing ghost images and improve efficiency. The refractive materials also may be used in combination with the louver films of FIG. 5, and/or in combination with the corrective lens components of FIG. 6.

In example embodiments as depicted in FIG. 7, the transparent refractive material may include a first refractive material 92 and a second refractive material 94, wherein the first refractive material 92 has a refractive index that is different from a refractive index of the second refractive material 94. The first refractive material 92, having a refractive index denoted $r_p$, is located in peripheral parts of the HMD system 90 associated with the first and second image panels 12 and 14. The second refractive material 94, having a refractive index denoted $r_c$, is located in central parts of the HMD system 90 associated with the third and fourth image panels 32 and 34. In other words, light emitted from the first and second image panels 12 and 14 passes through the first refractive material 92, and light emitted from the third and fourth image panels 32 and 34 passes through the second refractive material 94. As referenced above, the refractive indices of the first refractive material and the second refractive material, $r_p$ and $r_c$, may be different. For example, $r_P$ may be air having a refractive index of 1.0, and $r_C$ may be PMMA having a refractive index of 1.5. The lens components may be formed integral with the refractive materials, i.e., the lens components may be a curved shaping of a respective refractive material, or the lens components may be separate elements bonded to the respective refractive material.

In another exemplary embodiment, secondary corrective lenses comparably as in the embodiment of FIG. 6 may be positioned centrally bonded within a respective refractive material block. It is possible to have bonding within blocks of both refractive materials if a low index glue and a Fresnel lens structure is used, or if the corrective lens has a significantly different refractive index relative to the refractive material block. Such structure may be incorporated with a polarizers located at various positions (central, on mirror or at the eyepiece), and/or with a QWP on one or both mirror components.

FIG. 8 is a drawing depicting a top view of another exemplary head-mounted display (HMD) system 100 in accordance with embodiments of the present invention, including a central refractive material and singular lens components for each eyepiece. In this embodiment, optical paths between the lens components and either the third or fourth image panels or the respective peripheral first and second image panels should be the same to achieve high image quality. Matching the optical paths can be done geometrically as spatial limitations permit. In the example of FIG. 8, matched optical properties further is achieved by locating a non-air high refractive index material 106 (e.g., PMMA) in the optical pathway through which light emitted from the third and fourth image panels passes. The high refractive material 106 aids the optical path matching by allowing more flexibility in the system geometry and spatial configuration.

An aspect of the invention, therefore, is a head-mounted display (HMD) system including two main image panels and two additional panels, wherein the image panels are positioned to emit image light that optimally fills a typical visual field. In exemplary embodiments, a head-mounted display (HMD) system includes an optical arrangement; a first image panel, wherein the optical arrangement directs image light from the first image panel along a first optical pathway; a second image panel, wherein the optical arrangement directs image light from the second image panel along a second optical pathway different from the first optical pathway; and a third image panel and a fourth image panel, wherein the third and fourth image panels are spaced apart from each other and the optical arrangement directs light from the third image panel and the fourth image panel along different optical pathways. The optical arrangement is configured such that light from the first image panel and the third image panel are emitted from the HMD system in a combined fashion in a first eye direction, and light from the second image panel and the fourth image panel are emitted from the HMD system in a combined fashion in a second eye direction different from the first eye direction. The HMD system may include one or more of the following features, either individually or in combination.

In an exemplary embodiment of the HMD system, the first and second image panels are located on a viewing side of the HMD system, and the third and fourth image panels are located on a non-viewing side of the HMD system.

In an exemplary embodiment of the HMD system, the first image panel and the second image panel are rectangular image panels of equal dimensions, and combined dimensions of the third and fourth image panels are equal to the equal dimensions of the first and second image panels.

In an exemplary embodiment of the HMD system, the third image panel and the fourth image panel are of equal dimensions.

In an exemplary embodiment of the HMD system, the first image panel and the third image panel are positioned on opposite sides of an ocular axis, and the second image panel and the fourth image panel are positioned on opposite sides of the ocular axis.

In an exemplary embodiment of the HMD system, the optical arrangement includes first and second lens components that extend perpendicularly relative to the ocular axis respectively between the first and third image panels and the second and fourth image panels.

In an exemplary embodiment of the HMD system, in an orientation of use, the first and second image panels are arranged with long sides horizontal and short sides vertical, and the third and fourth image panels are also arranged with long sides horizontal and short sides vertical.

In an exemplary embodiment of the HMD system, the optical arrangement includes first and second lens components that extend an acute angle off of perpendicular relative to the ocular axis respectively between the first and third image panels and the second and fourth image panels.

In an exemplary embodiment of the HMD system, in an orientation of use, the first and second image panels are arranged the long sides at an acute angle relative to horizontal and short sides at an acute angle relative to vertical, and the third and fourth image panels are also arranged with long sides at an acute angle relative to horizontal and short sides at an acute angle relative to vertical.

In an exemplary embodiment of the HMD system, the optical arrangement comprises a plurality of mirror components and a plurality of lens components, wherein the plurality of mirror components are configured to direct image light from the first, second, third, and fourth image panels along respective optical pathways to the plurality of lens components.

In an exemplary embodiment of the HMD system, the optical arrangement comprises: a first mirror assembly that directs image light from the first image panel to a first lens component; a second mirror assembly that directs image light from the second image panel to a second lens component; a third mirror assembly that directs image light from the third image panel to the first lens component; and a fourth mirror assembly that directs image light from the fourth image panel to the second lens component.

In an exemplary embodiment of the HMD system, the first mirror assembly and the second mirror assembly each has a folded arrangement including a plurality of mirror segments.

In an exemplary embodiment of the HMD system, the optical arrangement further comprises a polarizer located on each of the lens components, and a quarter wave plate located respectively on a mirror component associated with each of the first through fourth image panels.

In an exemplary embodiment of the HMD system, the optical arrangement includes a plurality of light-directing components that are configured to direct light along certain optical pathways.

In an exemplary embodiment of the HMD system, the plurality of light-directing components comprises a louver film located on each of the first, second, third, and fourth image panels.

In an exemplary embodiment of the HMD system, the plurality of light-directing components comprises a plurality of corrective lens elements that operate as a secondary lens for optical pathways of light emitted from each of the first, second, third, and fourth image panels.

In an exemplary embodiment of the HMD system, a volume between an image panel and a lens component is filled with a transparent refractive material.

In an exemplary embodiment of the HMD system, the transparent refractive material comprises a first refractive material located in peripheral parts of the HMD system associated with the first image panel and the second image panel such that light from the first and second image panels passes through the first refractive material; the transparent refractive material further comprises a second refractive material located in central parts of the HMD system associated with the third and fourth image panels such that light from the third and fourth image panels passes through the second refractive material; and a refractive index of the first refractive material differs from a refractive index of the second refractive material.

In an exemplary embodiment of the HMD system, the first refractive material is air and the second refractive material is Poly(methyl methacrylate) (PMMA).

In an exemplary embodiment of the HMD system, the plurality of lens components includes a singular first eye lens component that is positioned to receive light from the first image panel and the third image panel, and a singular second eye lens component that is positioned to receive light from the second image panel and the fourth image panel, and a non-air refractive material that is located in a central portion of the HMD system.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

The present invention relates to wearable displays, in particular for achieving small and light weight head-mounted display (HMD) systems. Hardware manufactured using this disclosure may be useful in the fields of virtual reality (VR) and augmented reality (AR) for both consumer and professional markets. HMD systems manufactured in accordance with this disclosure could have applications including gaming, entertainment, task support, medical, industrial design, navigation, transport, translation, education, and training.

REFERENCE SIGNS LIST

10—head-mounted display (HMD) system
12—first image panel
14—second image panel
16—right eye
18—left eye
20—offset portion of optical arrangement
22—first mirror assembly
24—first lens component
26—second mirror assembly
28—second lens component
32—third image panel
34—fourth image panel
36—third mirror assembly
38—fourth mirror assembly
44—user's nose
60—head-mounted display (HMD) system 62—polarizers
64—quarter wave plates (QWPs)
70—head-mounted display (HMD) system
72—louver films
80—head-mounted display (HMD) system
82—corrective lens elements
90—head-mounted display (HMD) system
92—first refractive material
94—second refractive material
100—head-mounted display (HMD) system
106—high refractive index material

What is claimed is:

1. A head-mounted display (HMD) system comprising:
an optical arrangement;
a first image panel, wherein the optical arrangement directs image light from the first image panel along a first optical pathway;
a second image panel, wherein the optical arrangement directs image light from the second image panel along a second optical pathway different from the first optical pathway; and
a third image panel and a fourth image panel, wherein the third and fourth image panels are spaced apart from each other and the optical arrangement directs light from the third image panel and the fourth image panel along different optical pathways; and
wherein:
the optical arrangement is configured such that light from the first image panel and the third image panel are emitted from the HMD system in a combined fashion in a first eye direction, and light from the second image panel and the fourth image panel are emitted from the HMD system in a combined fashion in a second eye direction different from the first eye direction;
the optical arrangement comprises a plurality of mirror components and a plurality of lens components, wherein the plurality of mirror components are configured to direct image light from the first, second, third, and fourth image panels along respective optical pathways to the plurality of lens components; and
the plurality of mirror components and the plurality of lens components comprises:
a first mirror assembly that directs image light from the first image panel to a first lens component;
a second mirror assembly that directs image light from the second image panel to a second lens component;
a third mirror assembly that directs image light from the third image panel to the first lens component; and
a fourth mirror assembly that directs image light from the fourth image panel to the second lens component.

2. The HMD system of claim 1, wherein the first and second image panels are located on a viewing side of the HMD system, and the third and fourth image panels are located on a non-viewing side of the HMD system.

3. The HMD system of claim 1, wherein the first image panel and the second image panel are rectangular image panels of equal dimensions, and combined dimensions of the third and fourth image panels are equal to the equal dimensions of the first and second image panels.

4. The HMD system of claim 1, wherein the third image panel and the fourth image panel are of equal dimensions.

5. The HMD system of claim 1, wherein the first image panel and the third image panel are positioned on opposite sides of an ocular axis, and the second image panel and the fourth image panel are positioned on opposite sides of the ocular axis.

6. The HMD system of claim 5, wherein the optical arrangement includes first and second lens components that extend perpendicularly relative to the ocular axis respectively between the first and third image panels and the second and fourth image panels.

7. The HMD system of claim 6, wherein in an orientation of use, the first and second image panels are arranged with long sides horizontal and short sides vertical, and the third and fourth image panels are also arranged with long sides horizontal and short sides vertical.

8. The HMD system of claim 5, wherein the optical arrangement includes first and second lens components that extend at an acute angle off of perpendicular relative to the ocular axis respectively between the first and third image panels and the second and fourth image panels.

9. The HMD system of claim 8, wherein in an orientation of use, the first and second image panels are arranged with long sides at an acute angle relative to horizontal and short sides at an acute angle relative to vertical, and the third and fourth image panels are also arranged with long sides at an acute angle relative to horizontal and short sides at an acute angle relative to vertical.

10. The HMD system of claim 1, wherein the first mirror assembly and the second mirror assembly each has a folded arrangement including a plurality of mirror segments.

11. The HMD system of claim 1, wherein the optical arrangement further comprises a polarizer located on each of the lens components, and a quarter wave plate located respectively on a mirror component associated with each of the first through fourth image panels.

12. The HMD system of claim 1, wherein the optical arrangement includes a plurality of light-directing components that are configured to direct light along certain optical pathways.

13. The HMD system of claim 12, wherein the plurality of light-directing components comprises a louver film located on each of the first, second, third, and fourth image panels.

14. The HMD system of claim 12, wherein the plurality of light-directing components comprises a plurality of corrective lens elements that operate as a secondary lens for optical pathways of light emitted from each of the first, second, third, and fourth image panels.

15. The HMD system of claim 1, wherein a volume between an image panel and a lens component is filled with a transparent refractive material.

16. The HMD system of claim 15, wherein:
the transparent refractive material comprises a first refractive material located in peripheral parts of the HMD system associated with the first image panel and the second image panel such that light from the first and second image panels passes through the first refractive material;
the transparent refractive material further comprises a second refractive material located in central parts of the HMD system associated with the third and fourth image panels such that light from the third and fourth image panels passes through the second refractive material; and
a refractive index of the first refractive material differs from a refractive index of the second refractive material.

17. The HMD system of claim 16, wherein the first refractive material is air and the second refractive material is Poly(methyl methacrylate) (PMMA).

18. The HMD system of claim 1, wherein the plurality of lens components includes a singular first eye lens component that is positioned to receive light from the first image panel and the third image panel, and a singular second eye lens component that is positioned to receive light from the second image panel and the fourth image panel, and a non-air refractive material that is located in a central portion of the HMD system.

19. A head-mounted display (HMD) system comprising:
an optical arrangement;
a first image panel, wherein the optical arrangement directs image light from the first image panel along a first optical pathway;
a second image panel, wherein the optical arrangement directs image light from the second image panel along a second optical pathway different from the first optical pathway; and
a third image panel and a fourth image panel, wherein the third and fourth image panels are spaced apart from each other and the optical arrangement directs light from the third image panel and the fourth image panel along different optical pathways; and
wherein:
the optical arrangement is configured such that light from the first image panel and the third image panel are emitted from the HMD system in a combined fashion in a first eye direction, and light from the second image panel and the fourth image panel are emitted from the HMD system in a combined fashion in a second eye direction different from the first eye direction;
the first image panel and the third image panel are positioned on opposite sides of an ocular axis, and the second image panel and the fourth image panel are positioned on opposite sides of the ocular axis; and
the optical arrangement includes first and second lens components that extend at an acute angle off of perpendicular relative to the ocular axis respectively between the first and third image panels and the second and fourth image panels.

20. A head-mounted display (HMD) system comprising:
an optical arrangement;
a first image panel, wherein the optical arrangement directs image light from the first image panel along a first optical pathway;
a second image panel, wherein the optical arrangement directs image light from the second image panel along a second optical pathway different from the first optical pathway; and
a third image panel and a fourth image panel, wherein the third and fourth image panels are spaced apart from each other and the optical arrangement directs light from the third image panel and the fourth image panel along different optical pathways; and
wherein:
the optical arrangement is configured such that light from the first image panel and the third image panel are emitted from the HMD system in a combined fashion in a first eye direction, and light from the second image panel and the fourth image panel are emitted from the HMD system in a combined fashion in a second eye direction different from the first eye direction;
the first image panel and the third image panel are positioned on opposite sides of an ocular axis, and the second image panel and the fourth image panel are positioned on opposite sides of the ocular axis;
the optical arrangement includes first and second lens components that extend at an acute angle off of perpendicular relative to the ocular axis respectively between the first and third image panels and the second and fourth image panels; and
in an orientation of use, the first and second image panels are arranged with long sides at an acute angle relative to horizontal and short sides at an acute angle relative to vertical, and the third and fourth image panels are also arranged with long sides at an acute angle relative to horizontal and short sides at an acute angle relative to vertical.

* * * * *